Patented Jan. 1, 1952

2,581,035

UNITED STATES PATENT OFFICE 2,581,035

ANION EXCHANGE RESIN ANTACID

Gustav J. Martin and John Wilkinson, Philadelphia, Pa., assignors to The National Drug Company, Philadelphia, Pa., a corporation of Pennsylvania No Drawing. Application March 26, 1949, Serial No. 83,763

6 Claims. (Cl. 167—55)

This invention relates to antacid compositions for use in human therapy. More particularly it relates to therapeutically useful compositions in extremely finely divided form comprising anion exchange resins obtained from the condensation of a phenol, formaldehyde and alkylene polyamines.

This application is a continuation-in-part of our application Ser. No. 630,986, filed November 26, 1945, now abandoned.

Of recent years an increasingly large group of persons have been afflicted with peptic and duodenal ulcers, a condition frequently associated with hyperacidity wherein the concentration of free hydrochloric acid in the gastric secretions after ingestion of food is abnormally high. It is generally agreed in the medical profession that the dominant factor in the development of hyperacidity is the action of pepsin-hydrochloric acid in the gastric juice. Since pathological conditions normally associated with hyperacidity are confined to areas exposed to the action of acid and enzymes, measures directed toward the prevention of excessive gastric secretion and the neutralization or lessening of an unduly high degree of acidity of the gastric juices are of outstanding value in the healing of pathological conditions accompanying hyperacidity.

The requirements for agents to be used therapeutically in the treatment of hyperacidity are very rigid and difficult of attainment. According to authoritative medical sources, any agent to be used successfully for this purpose must meet the following criteria:

(1) It must be non-toxic even in relatively large amounts.

(2) It must be insoluble in the liquids of the stomach.

(3) It must not irritate the stomach or intestines.

(4) It must be neutral in aqueous suspension, but nevertheless, must be capable of neutralizing acid.

(5) It must not unduly alter the acid-base equilibrium in the body.

(6) It must not alkalize the urine, with attendant dangers of precipitating crystalline phosphates in the kidney or ureter when taken in reasonable amounts.

(7) It must not cause diarrhea or constipation.

(8) It must not seriously alter mineral metabolism.

In addition to the above, the preparation should be of such nature that the optimum dosage and form of administration does not cause revulsion in the patient and made administration difficult or unpleasant.

Up to the present time no known agent heretofore prescribed for treating hyperacidity has been capable of meeting all of the foregoing requirements. For example, alkaline substances such as sodium bicarbonate or bismuth subcarbonate have a tendency to produce an undesirable alkalosis in the patient, while the various aluminum-containing preparations, e. g. aluminum hydroxide or the sodium aluminum silicates of the zeolite type, when used alone or in conjunction with other materials, invariably cause constipation. Furthermore, many individuals, particularly those inherently constipated or with defective pancreatic secretions cannot tolerate sodium aluminum silicate antacid preparations.

We have now found that a composition essentially comprising an extremely finely divided anion exchange resin consisting of a water-insoluble solid, polymeric condensation product of a phenol, formaldehyde and an alkylene polyamine, all of the particles of which resin will pass through a 100 mesh screen of the U. S. Standard Sieve Series, meets all of the foregoing requirements for the first time. Needless to say, this discovery is of tremendous importance in the treatment of ulcers and related disorders attributable to hyperacidity. The anion exchange resins of the above mentioned type possess not only the property of neutralizing excess acidity in the gastric juices, but also have the unexpected advantage of absorbing both the alkaline and acid proteinase of gastric juices, namely, pepsin and trypsin.

For successful administration of these resins, it is essention that they be of such particle size that they will pass through a 100 mesh screen of the U. S. Sieve Series, U. S. Bureau of Standards, Standard Screen Series, 1919, as described in Lange's Handbook of Chemistry, Fourth Edition, page 707. On this scale a 100 mesh screen has a clear opening of 0.149 mm. in width. When any appreciable portion of the resin particles are of such size that they will not pass through a 100 mesh screen, the larger particles are believed to cause irritation of ulcerated surfaces, unduly complicating the treatment. It has also been found that for the larger particle sizes, increased dosages are required to obtain the same effect on the gastric juices, with attendant disadvantages to the patient. For example, a resin of 40 mesh particle size (resin particles which will just pass a 40 mesh screen) must be prescribed in approximately twice the dosage required for the same resin ground to pass a 100 mesh screen.

Extensive medical experience has shown, furthermore, that many patients are nauseated from the gritty unpalatable dosage when particle sizes larger than 100 mesh are administered. Since the treatment of hyperacidity with the described anion exchange resins requires frequent administration of the dosage to the patient, the factors referred to previously are of critical importance. If the extremely fine particle size mentioned above is not selected, many serious difficulties will be encountered despite the otherwise excellent properties of the resin.

The anion exchange resins which we have found to have such surprising therapeutic advantages are water-insoluble high-polymeric solid condensation products of a phenol, formaldehyde and an alkylene polyamine. The alkylene groups of the polyamine may be interrupted by imino (—NH—) groups to form alkylene chains of at least two carbon atoms between nitrogen atoms. Toxic or other undesirable impurities should be dissolved in suitable solvents, or otherwise separated from the resin before it is incorporated in the therapeutic compositions of this invention. Some of these resins and processes for their preparation are described in U. S. Patent 2,402,384, issued June 18, 1946, on an application of John W. Eastes entitled "Ion Exchange Polyamine Resins and Method of Preparing Same." We prefer, however, to employ an anion exchange resin which is a condensation product of dihydroxyphenyl dimethyl methane, formaldehyde, and a polyethylene polyamine in basic form obtained, for example, as disclosed in the aforementioned patent. In particular, we prefer to employ a resin which is a condensation product of dihydroxyphenyl dimethyl methane, formaldehyde, and tetraethylene pentamine. This product may be produced according to Example 4 of the foregoing patent. It is known to the trade as "Amberlite IR-4" and sometimes as "XE-58" and is marketed by The Resinous Products and Chemical Company of Philadephia, Pa. Resins of this general type are marketed by other concerns under different trade names. If desired, mixtures of these resins may be employed.

For use herein the solid resinous condensation products must be ground extremely fine, to a particle size which will pass through a 100 mesh screen. Even smaller particle sizes, capable of passing through a 200 mesh screen, may be used with excellent results, either alone or in admixture with larger particle sizes up to that mentioned previously.

The above described water-insoluble solid anion exchange resins of the required degree of fineness of particle size, when administered in prescribed dosages provide practically immediate relief from the pains attributable to ulcers and related disorders. Due to the unsual adsorptive properties of these resins, they aid in the removal of toxic gases produced in the stomach and intestinal tract, thereby further relieving the patient's distress. In contrast, many of the antacid materials previously prescribed for ulcers actually create gas under the same conditions of administration. It is known further that the anion exchange resins described herein have remarkable adsorptive properties for indole and skatol which are produced endogenously. Furthermore, these resins do not remove valuable nutrients from the body, such as vitamins, amino acids, and minerals.

The antacid compositions of this invention may contain supplemental ingredients such as vitamins, amino acids, antibiotics, nutritional ingredients generally, specific therapeutic ingredients, gel-forming agents, wetting agents, and the like. While these compositions may be administered in either liquid or dry form, the latter is preferred. A particularly efficient method of administration is to surround the antacid composition in dry form with a gelatin capsule which may be swallowed by the patient. Each capsule may contain ¼ or ½ gram of the antacid composition. The average daily dose is from 5 to 15 grams, advisably taken in the form of 1 or 2 capsules every two hours during the waking day. Hence, capsules of the foregoing type are especially convenient for this purpose.

The following examples, wherein parts are by weight, disclose typical antacid compositions conforming to our invention. Screen mesh sizes as employed in the following examples and elsewhere in the specification and claims are those of the U. S. Sieve Series, U. S. Bureau of Standard Screen Series, 1919.

Example I

| | Parts |
|---|---|
| "Amberlite IR-4" (of previously defined composition and passing a 100 mesh screen) | 10.0 |
| Sucrose U. S. P. | 20.0 |
| Glycerine | 10.0 |
| Bentonite U. S. P. | 2.1 |
| Salicylic acid | 0.3 |
| Oil lime | 0.1 |
| Oil lemon | 0.1 |
| Dist. water, q. s. ad. | 100.0 |

The aqueous suspension is formed by dissolving the salicylic acid in an amount of water equivalent to 60 per cent of the volume of the final composition. The bentonite is then added and the Amberlite IR-4 is stirred in to form a colloidal gel. This gel is passed through a colloid mill three times. Thereafter, the glycerine, sucrose, oil of lime, oil of lemon, and the remaining water are added with stirring until a thorough dispersion is obtained. The composition is then strained through cheese cloth.

The antacid composition of this example is substantially tasteless and uniform, and is stable in storage. One gram of this antacid composition will counteract the acidity of 5 to 75 cc. of 0.1 N hydrochloric acid, depending upon the final pH desired.

When this composition is administered to adults suffering from hyperacidity, in dosages from 1 gram to 15 grams, depending upon the degree of hyperacidity, no toxic effects are observed, and the excess acidity of the gastric juice is no longer present after ten minutes or less. Where hyperacidity is accompanied by gas distress, this symptom is also partially relieved, and the gastric juices of the stomach show a complete lack of pepsin and trypsin. The balance of the other ingredients of the gastric juices is in no way adversely affected.

Example II

| | Parts |
|---|---|
| Tragacanth | 2.0 |
| "Amberlite IR-4" (of previously defined composition and passing a 100 mesh screen) | 10.0 |
| P-hydroxybenzoic acid | 0.3 |
| Invert sugar | 15.0 |
| Oil lime | 0.35 |
| Oil lemon | 0.35 |
| Dist. water q. s. | 100.0 |

The composition of this example is compounded in substantially the same way as the preceding example and has substantially the same physiological properties.

*Example III*

| | Parts |
|---|---|
| "Amberlite IR-4" (of the same composition as Ex. I, but passing a 200 mesh screen) | 99.9 |
| Sodium lauryl sulfate | 0.1 |

Other wetting agents which are non-toxic may be used in place of the sodium lauryl sulfate. When used they usually represent from 0.005 to 3 per cent of the composition, depending upon their wetting power. Of course, wetting agents may be dispensed with entirely, if desired.

The compositions of this example may be administered in gelatin capsules or tablets containing from 100 mg. to 3 grams, preferably from 0.25 to 0.5 gram, each of the resin. The tablets may be formed by the introduction of an agent assisting in the formation of a loosely held agglomeration, such as a sucrose binder, or both pressure and a binding agent may be used.

The compositions of this invention are especially valuable for use in treatment of peptic and duodenal ulcers, because in contrast to certain other antacids, these resins do not cause acid rebound, do not remove phosphate or calcium from the body and do not produce constipation. Thus, applicants' compositions have all the advantageous characteristics of previously known antacids with none of the disadvantageous properties which upon administration produce physiologically undesirable side effects.

As many apparently widely different embodiments of this invention may be made without departing from the spirit and scope hereof, it is to be understood that the invention is not limited to the specific embodiments hereof, except as defined in the appended claims.

We claim:

1. A therapeutically active anion-exchange resin composition particularly adapted for the treatment of peptic and duodenal ulcers, comprising a solid, finely divided, water-insoluble high polymeric condensation product of a phenol, formaldehyde and an alkylene polyamine, reduced to a particle size substantially that which will pass through a 200 mesh screen of the U. S. Sieve Series.

2. A therapeutically active anion-exchange resin composition particularly adapted for the treatment of peptic and duodenal ulcers, comprising a solid, finely divided, water-insoluble high polymeric condensation product of dihydroxyphenyl dimethyl methane, formaldehyde and a polyethylene polyamine, reduced to a particle size of substantially 200 mesh.

3. A therapeutically active anion-exchange resin composition particularly adapted for the treatment of peptic and duodenal ulcers, comprising a solid, finely divided, water-insoluble high polymeric condensation product of dihydroxyphenyl dimethyl methane, formaldehyde and tetraethylene pentamine, reduced to substantially a particle size which will pass through a 200 mesh screen of the U. S. Sieve Series.

4. A gelatin capsule containing from about ¼ to about ½ gram of the antacid composition of claim 3.

5. The composition defined by claim 1 characterized by the fact that it also contains a wetting agent for causing the finely divided condensation product to be wet by an aqueous phase.

6. The composition defined by claim 3 characterized by the fact that it also contains between about 0.005% and 3% of a wetting agent for causing the finely divided condensation product to be wet by an aqueous phase.

GUSTAV J. MARTIN.
JOHN WILKINSON.

REFERENCES CITED

The following references are of record in the file of this patent:

UNITED STATES PATENTS

| Number | Name | Date |
|---|---|---|
| 2,120,430 | Rieche | June 14, 1938 |
| 2,293,359 | Quisling | Aug. 18, 1942 |
| 2,402,384 | Eastes | June 18, 1946 |

OTHER REFERENCES

Segal, Gastroenterology, vol. 4, June 1945, pp. 484 to 496.

The Amberlites, published by Resinous Products & Chemical Co., Revised Ed., Oct. 1942, pp. 4, 11, 12, 21, 22, 23, 25, 27.

Becker, Chemical Abstracts, vol. 29, p. 5518 (1935).

Long, Clinical and Experimental Use of Sulfanilamide, Sulfapyridine and Allied Compounds, 1939, page 18.